United States Patent [19]

Sonoda

[11] Patent Number: 5,253,550
[45] Date of Patent: Oct. 19, 1993

[54] FLUID PRESSURE CONTROL DEVICE FOR AUTOMATIC TRANSMISSION

[75] Inventor: Shiro Sonoda, Toyoake, Japan

[73] Assignee: Aisin Seiki Kabushiki Kaisha, Kariya, Japan

[21] Appl. No.: 863,083

[22] Filed: Apr. 3, 1992

[30] Foreign Application Priority Data

Apr. 5, 1991 [JP] Japan .................................. 3-099753

[51] Int. Cl.⁵ ............................................ B00K 41/06
[52] U.S. Cl. ........................................ 74/868; 74/867
[58] Field of Search ............... 74/866, 869, 868, 867; 364/424.1

[56] References Cited

U.S. PATENT DOCUMENTS

| | | | |
|---|---|---|---|
| 3,688,608 | 9/1972 | Leach | 74/869 |
| 4,706,523 | 1/1987 | Nishikawa et al. | 74/869 |
| 4,713,989 | 12/1987 | Hayakawa et al. | 74/869 |
| 4,729,265 | 3/1988 | Sugano | 74/868 |
| 4,779,491 | 10/1988 | Fujiwara et al. | 74/868 |
| 5,012,699 | 5/1991 | Aoki et al. | 74/869 |
| 5,016,496 | 5/1991 | Sugano | 74/868 |
| 5,076,117 | 12/1991 | Shibayama | 74/868 |
| 5,117,712 | 6/1992 | Goto et al. | 74/869 X |
| 5,188,006 | 2/1993 | Goto et al. | 74/867 |

Primary Examiner—Leslie A. Braun
Assistant Examiner—Khoi Ta
Attorney, Agent, or Firm—Burns, Doane, Swecker & Mathis

[57] ABSTRACT

A fluid pressure control device having a timing valve with a spool which is adopted in an automatic transmission so as to operate in such a manner that a fluid pressure from a friction portion at a low speed side to the timing valve is drained rapidly therefrom due to axial movement of the spool according to a signal indicating an engine output upon a power-off up-shifting is comprised of a first pressure source from which a pressure indicating the engine output is set to be applied to one end of the spool, a second pressure source from which a pressure is set to be applied to the other end of the spool so as to be balanced with the pressure from the first pressure source across the spool other than the power-off up-shifting, and a device for increasing the pressure applied to one end of the spool from the first pressure source on the basis of a condition relating to an accelerator upon power-off up-shifting.

5 Claims, 7 Drawing Sheets

Fig. 8

| Shift position | | L/U | C0 | C1 | C2 | B0 | B1 | B2 | F0 | F2 |
|---|---|---|---|---|---|---|---|---|---|---|
| P | | | ○ | | | | | | ○ | |
| R | | | ○ | | ○ | | | ○ | ○ | |
| N | | | ○ | | | | | | ○ | |
| D | 4th | ○ | | ○ | ○ | ○ | | | | |
| | 3rd | ○ | ○ | ○ | ○ | | | | ○ | |
| | 2nd | | | ○ | | | ○ | | ◉ | |
| | 1st | | ○ | ○ | | | | | ○ | ◉ |
| 3 | 3rd | ○ | ○ | ○ | ○ | | | | ○ | |
| | 2nd | | | ○ | | | ○ | | ◉ | |
| | 1st | | ○ | ○ | | | | | ○ | ◉ |
| 2 | 2nd | | ○ | ○ | | | ○ | | ○ | |
| | 1st | | ○ | ○ | | | | | ○ | ◉ |
| L | 1st | | ○ | ○ | | | | ○ | ○ | ○ |

FLUID PRESSURE CONTROL DEVICE FOR AUTOMATIC TRANSMISSION

BACKGROUND OF THE INVENTION

The present invention relates to a fluid pressure control device for an automatic transmission, and in particular to a fluid pressure control device for an automatic transmission which controls the shift timing upon power-off up-shifting.

In general, when an automatic transmission is not provided with a one-way clutch at each of a frictional engaging portion of a low speed side and a frictional engaging portion of a high speed side, a timing valve is disposed in a fluid pressure control circuit so as to establish a well-timed shift operation through the rapid discharge of fluid pressure from the frictional engaging portion of the low speed side upon detection of an increase in the fluid pressure in the frictional engaging portion of the high speed side.

In FIG. 5, there is illustrated a conventional timing valve 1 which establishes the foregoing operation in the automatic transmission and which is set to establish engaging operations based on a table shown in FIG. 8. That is to say, the timing valve 1 is set to establish a well-timed drain of fluid pressure from a second brake B1 which is regarded as the frictional engaging portion of the low speed side upon an upward shifting from the second gear position to the third gear position.

The timing valve 1 has an input port 1a for receiving a pressure signal Ps from a pressure source via a throttle valve which indicates an opening of the throttle valve. Another input port 1b is provided on the timing valve 1 in order to receive a direct clutch fluid pressure Pc2 for engaging a direct clutch C2 as the frictional engaging portion of the high speed side as a result of an upward shifting toward a third gear side or position of a 2-3 shift valve 2 and the resulting fluid pressure or the supplied direct clutch fluid pressure Pc2 is set to oppose a biasing force of a spring 1B across a spool 1A. In addition, a third input port 1c is provided on the timing valve 1 so as to be inputted with a second brake fluid pressure PB1. If the second brake fluid pressure PB1 is drained from the timing valve 1 through a drain port 1d and an orifice 3 which results in the downward movement of the spool IA against the biasing force of the spring 1B, the drain port 1d is closed which leads to a drain of the second brake fluid pressure PB1 from the timing valve 1 through another drain port 1e.

Thus, when the 2-3 shift valve 2 is switched from the condition for the second gear stage to the condition for the third gear stage, as shown in FIG. 6(a), the second brake fluid pressure PB is decreased gradually due to its drain through the orifice 3 and contrary to this the direct clutch fluid pressure Pc2 is increased. As soon as the the direct clutch fluid pressure Pc2 becomes or reaches a set value or a timing valve switching pressure PT1, the spool 1A is then brought into downward movement against the biasing force of the spring 1B, a rapid drain of the second brake fluid pressure PB1 from the timing valve 1 through the drain port 1e is established. The foregoing timing control wherein the disengagement of the second brake B1 and the engagement of the direct clutch C2 are established concurrently assures the prevention of shock upon shifting.

Furthermore, as shown in FIG. 4, when a power-off up-shifting is established along a direction of "X" under a change of the throttle valve from 100% opening to 5% opening for example, the pressure signal Ps which depends on the opening of the throttle valve is supplied to the input port 1a, and the drain of the fluid pressure from the second brake B1 is established which is more rapid than normal. Thereafter, an underlap control is performed wherein the direct clutch C2 is engaged gradually in order to establish a smooth shifting.

However, in the foregoing or conventional fluid pressure control device which is adopted in the automatic transmission, the underlap operation is initiated only when the opening of the throttle valve is less than a set value of 10% for example, even though the pressure signal Ps is supplied to the input port 1a. This means that even though the power-off up-shift is established while the the opening of the throttle valve Th is greater than the foregoing degree, the underlap operation cannot be established, thereby performing the disengagement of the second brake B1 and the engagement of the direct clutch in a timing which is not less than that in the power-on up-shifting. Thus, as shown in FIG. 6(b), the torque variation of the output shaft becomes large, which leads to an excessive or large shock upon shifting.

In addition, in the foregoing structure, the underlap control is set to be established based on only the opening of the throttle valve, which brings an unexpected underlap control when the releasing speed of the accelerator is small.

SUMMARY OF THE INVENTION

It is an object of the invention to provide a fluid pressure control device for an automatic transmission without the above conventional drawbacks.

It is another object of the invention to provide a fluid pressure control device for an automatic transmission which enables an adequate underlap operation upon a power-off up-shifting.

In order to attain the foregoing objects, according to the present invention, a fluid pressure control device having a timing valve with a spool which is adopted in an automatic transmission so as to operate in such a manner that a fluid pressure from a friction portion at a low speed side to the timing valve is drained rapidly therefrom due to axial movement of the spool according to a signal indicating an engine output upon a power-off up-shifting is comprised of a first pressure source from which a pressure indicating the engine output is set to be applied to one end of the spool, a second pressure source from which a pressure is set to be applied to the other end of the spool so as to be balanced with the pressure from the first pressure source across the spool other than the power-off up-shifting, and a device for increasing the pressure applied to one end of the spool from the first pressure source on the basis of a condition relating to an accelerator upon power-off up-shifting.

BRIEF DESCRIPTION OF THE DRAWINGS

The above and other objects, features and advantages of the present invention will be more apparent and more readily appreciated from the following detailed description of preferred exemplarily embodiments of the present invention, taken in connection with the accompanying drawings, in which;

FIG. 8 shows a table for indicating the relationship between each shift gear position and each gear/clutch.

DESCRIPTION OF THE PREFERRED EMBODIMENT

Figure 1:
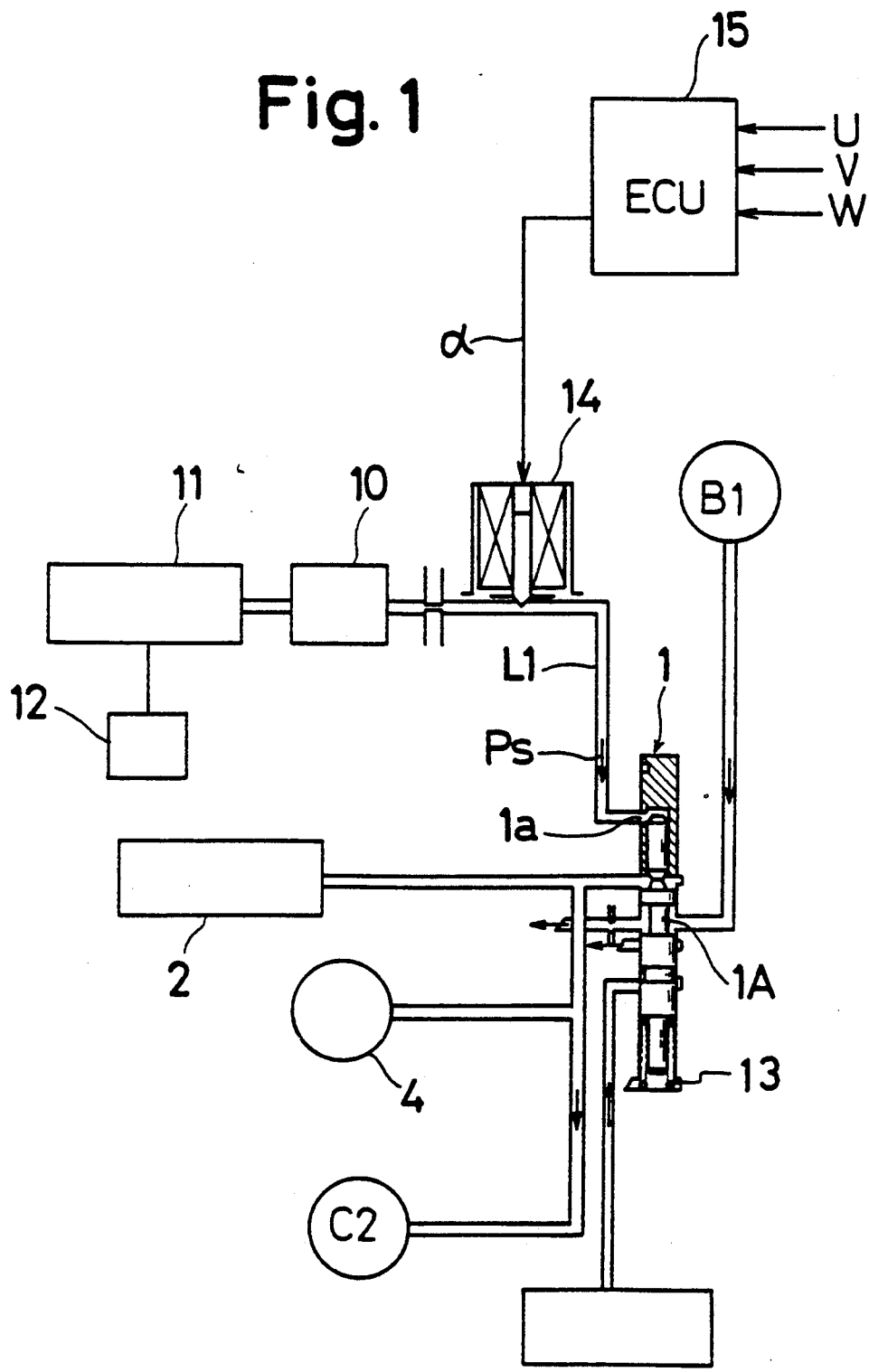
FIG. 1 is a fluid circuit of one embodiment of a fluid pressure control device for an automatic transmission according to the present invention.

Referring to FIG. 1, there is shown a fluid pressure control device for an automatic transmission according to the present invention and related components or devices which will be detailed later. Since the fluid pressure control device has components that are similar to the corresponding components in the conventional fluid pressure control valve in construction and operation, one or more specific components which have common reference numerals or characters, may not be explained.

A timing valve 1 has an input port 1a which is in fluid communication with an oil pump 12 via a preliminary regulator valve 11, a throttle valve 10, and a fluid passage L1. A throttle pressure Ps is set to be inputted or supplied to the the input port 1a of the timing valve 1. In the fluid passage L1, there is disposed a solenoid valve 14 which is in the normally opened position. The solenoid valve 14 is set to be closed (i.e., moved to an unrestricted fluid flow position) upon receipt of an on-signal $\alpha$ from an electric control unit ECU which is in the form of a microprocessor.

Figure 2:
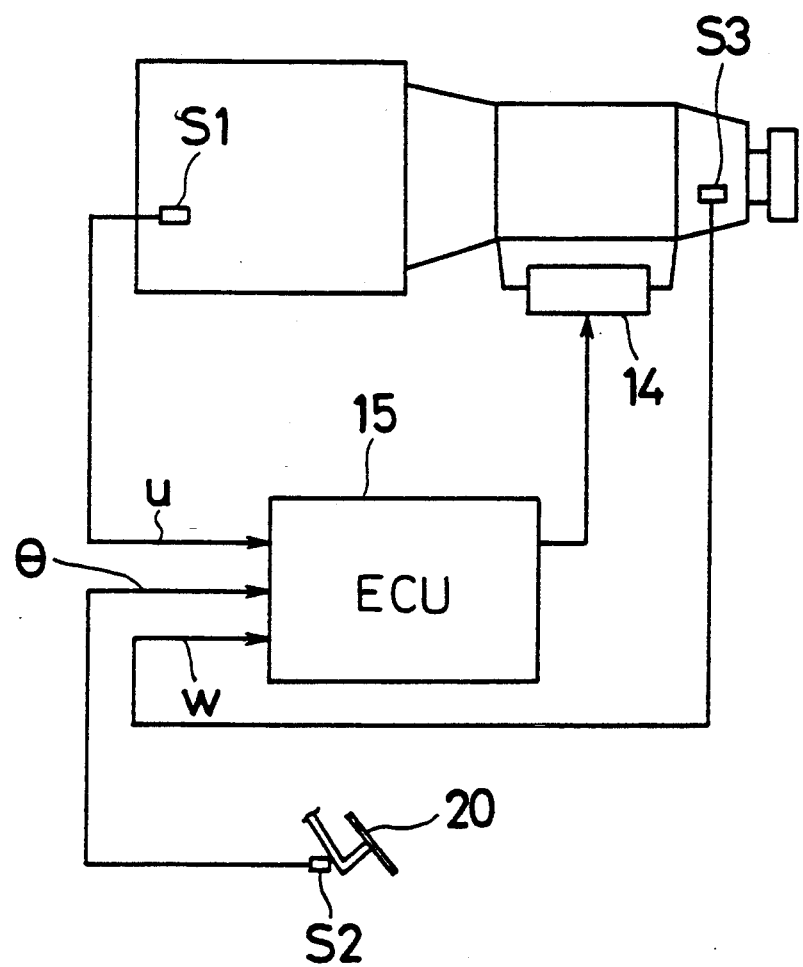
FIG. 2 is a view showing a control system relating to one embodiment of a fluid pressure control device for an automatic transmission according to the present invention.

As shown in FIG. 2, the electric control unit ECU is set to receive a throttle opening signal u, an accelerator opening signal $\Theta$, and a vehicle speed signal w from an engine throttle sensor S1, an accelerator opening sensor S2 operatively associated with an accelerator 20, and a speed sensor S3 connected to an output shaft of an automatic transmission, respectively.

Figure 3:
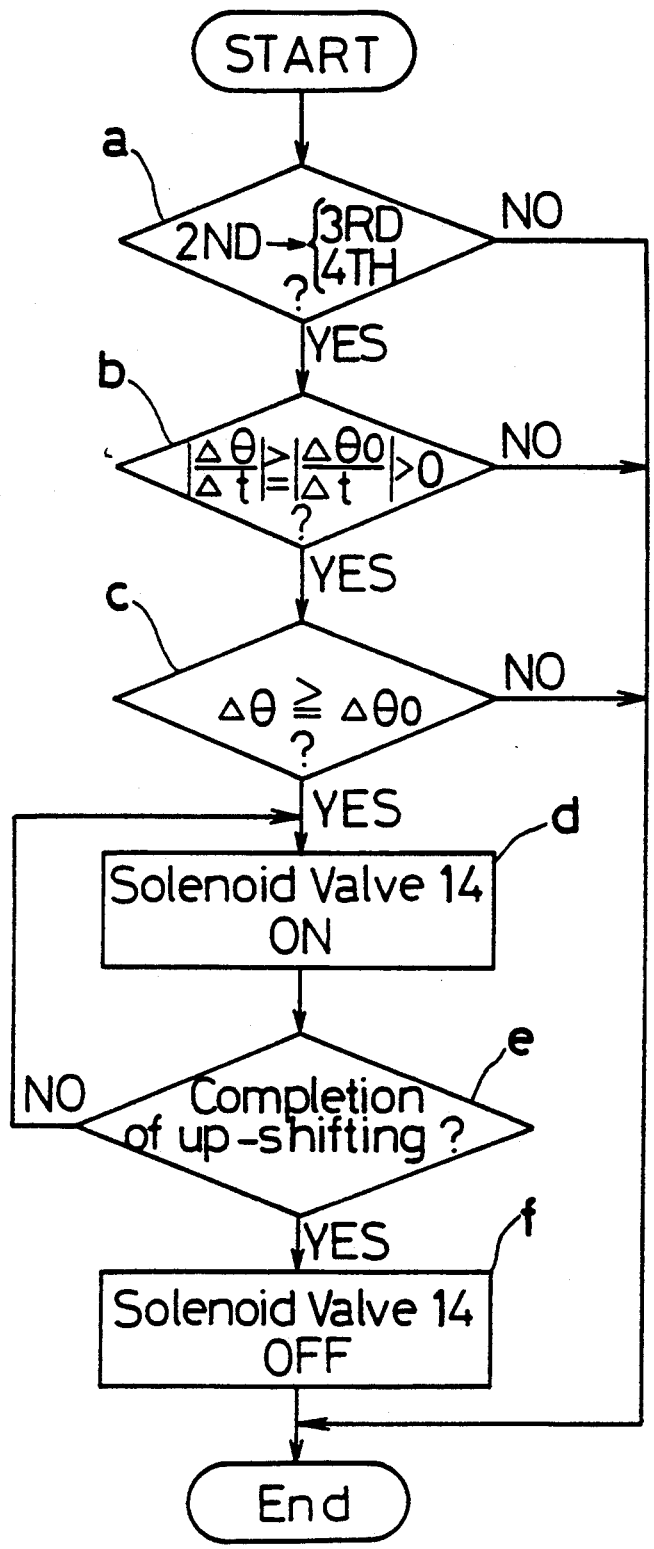
FIG. 3 is a flowchart showing the control of a solenoid valve in one embodiment of a fluid pressure control device for an automatic transmission according to the present invention.

An operation of the fluid pressure control device will be described hereinafter on the basis of a flowchart shown in FIG. 3.

Figure 4:
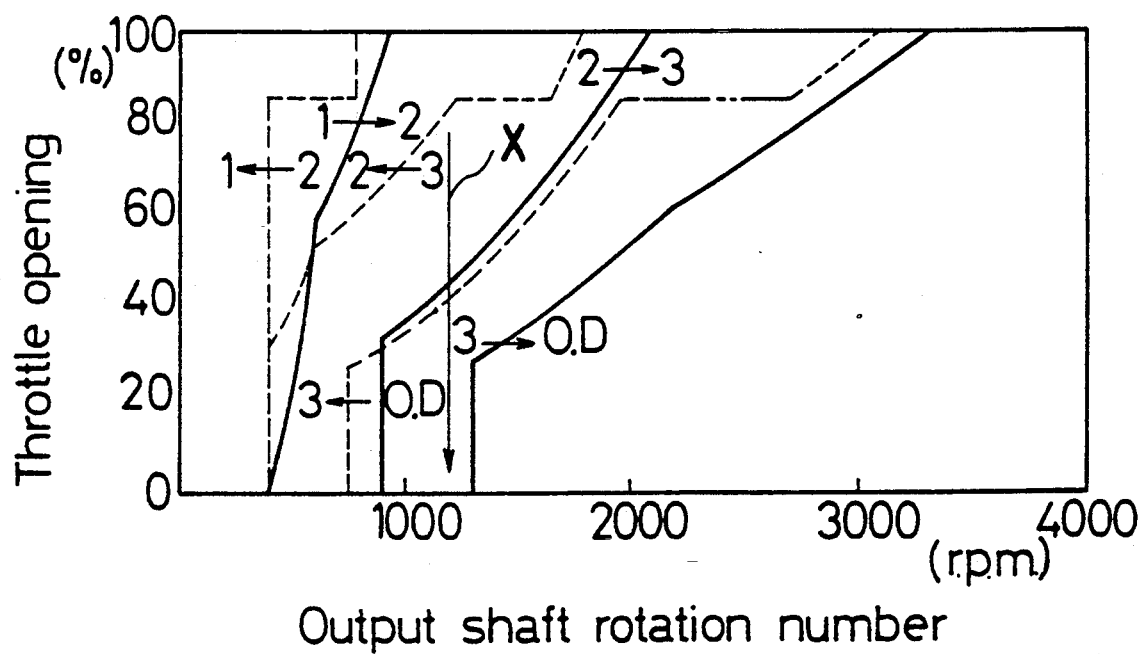
FIG. 4 shows characteristic lines in an automatic transmission.
Figure 5:
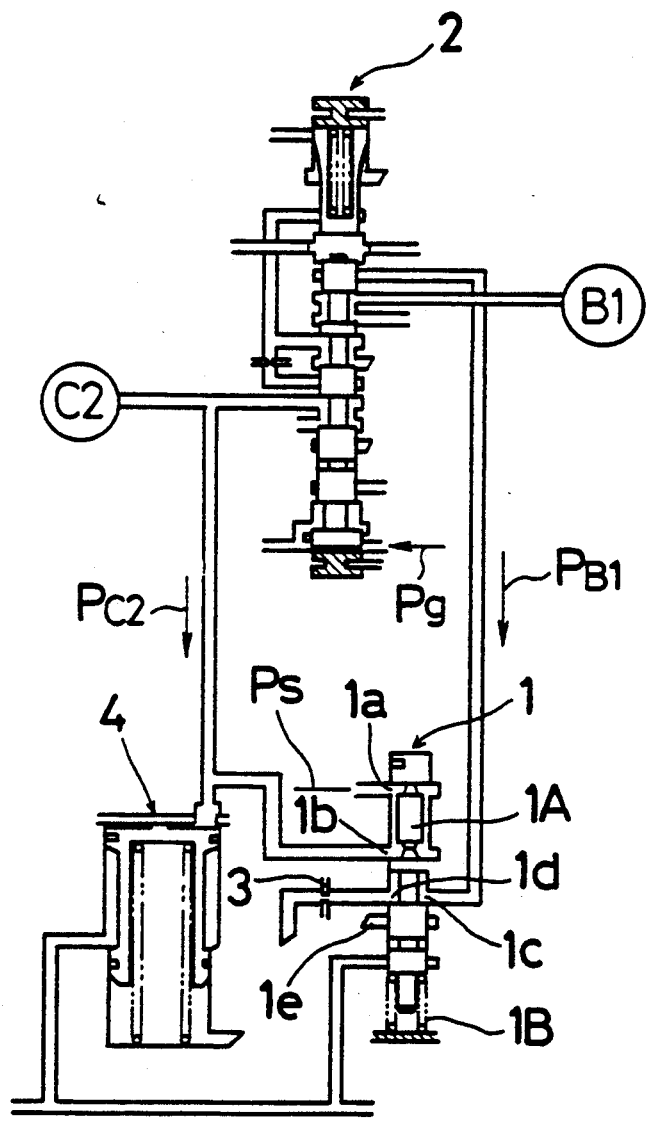
FIGS. 5 shows a conventional fluid pressure control device.
Figure 6:
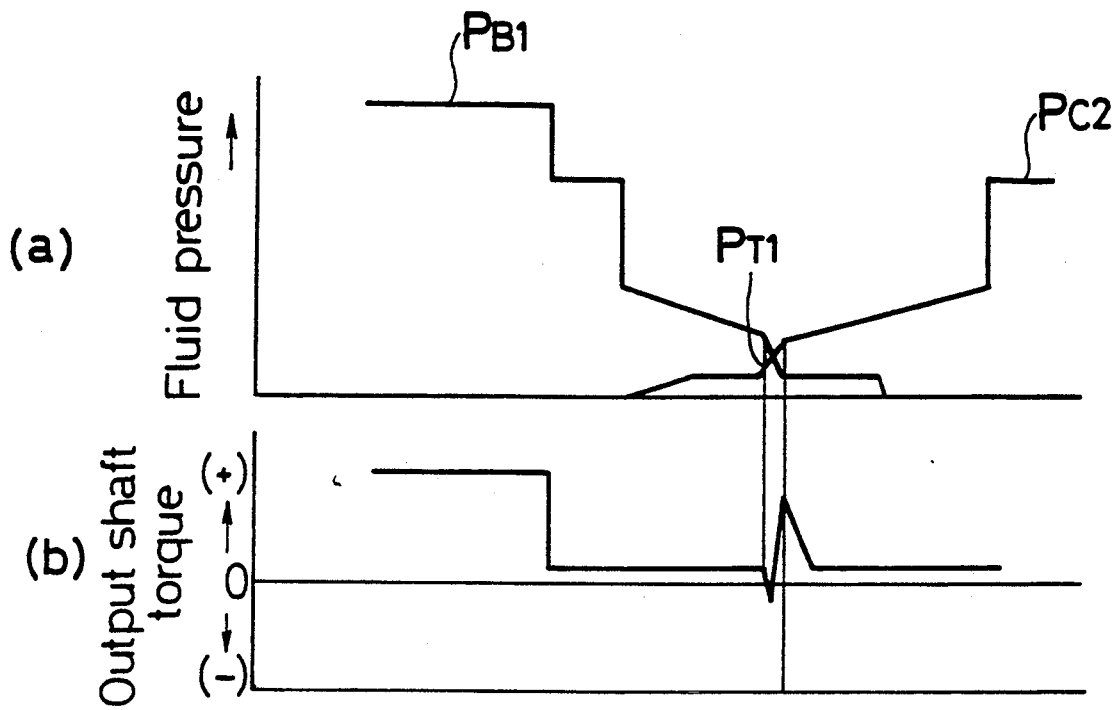
FIG. 6 is a characteristic chart of fluid pressure of a device in FIG. 5 under a normal control.
Figure 7:
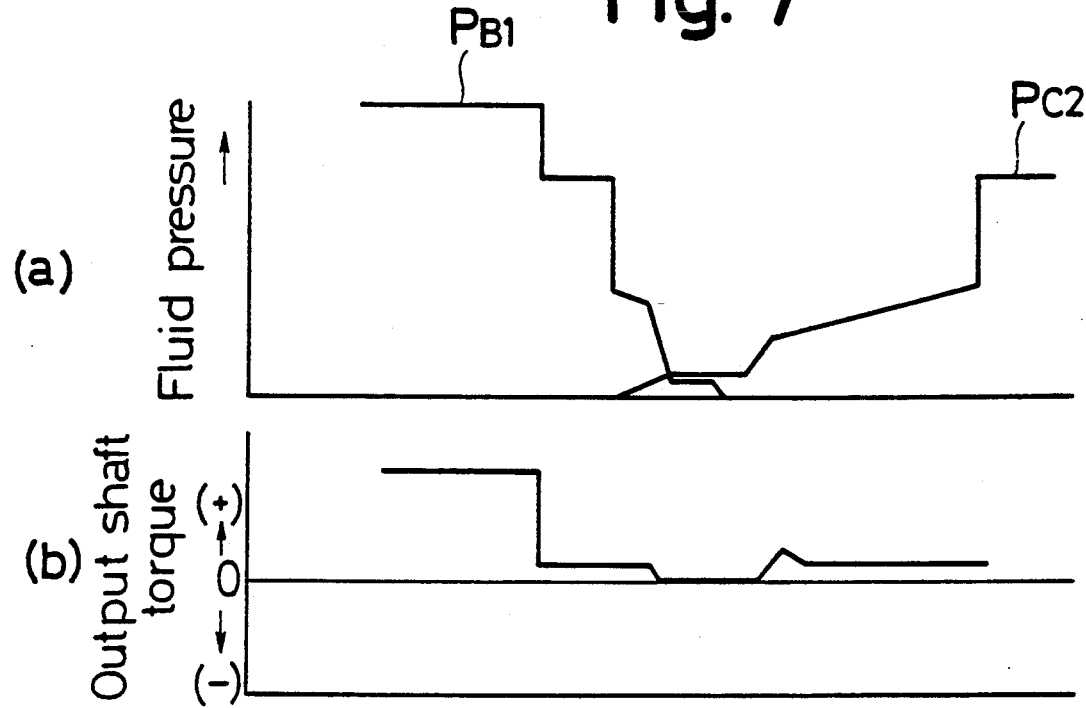
FIG. 7 is a characteristic chart of fluid pressure of a device in FIG. 5 under the underlap control.

First of all, the electric control unit ECU begins to determine, upon receipt of the vehicle speed signal w and the throttle opening signal u with reference to the characteristic chart shown in FIG. 4, whether an up-shifting is initiated or not (step a). If so, after receipt of the accelerator opening signal $\Theta$, the changing ratio of the accelerator opening $\Delta\Theta/\Delta t$ is calculated, and the resulting value is checked to determine whether it is less than zero which represents the power-off up-shifting and not greater than a set value of $\Delta\Theta 0/\Delta t$. In other words, whether an equation of $|\Delta\Theta/\Delta t| \geq |\Delta\Theta 0/\Delta t|$ is satisfied or not (step b). In this step, if the power-off up-shifting is recognized and the accelerator opening changing ratio $\Delta\Theta/\Delta t$ is found to be not greater than the set value of $\Delta\Theta 0/\Delta t$, a change in the accelerator opening is checked to determine whether it is greater than a set value of $\Delta\Theta 0/$ which is, for example, 10% or not (step c). If so, the solenoid valve 14 is supplied with the on-signal $\alpha$ whereupon the solenoid valve 14 moves to the closed or unrestricted flow position. Thereafter, determining completion of the power-off up-shifting is established (step e) by using the chart shown in FIG. 4 with reference to the frictional fluid pressure, the rotational number of the engine, and the rotational number of the automatic transmission. If the completion of the power-off up-shifting is recognized, the supply of the on-signal $\alpha$ to the solenoid valve 14 is stopped.

As mentioned above, when it is satisfied that the absolute value of the changing ratio of the accelerator opening $|\Delta\Theta/\Delta t|$ is greater than $|\Delta\Theta 0/\Delta t|$ and is greater than zero, and when it is satisfied that the change in the accelerator opening $\Delta\Theta$ is greater than $\Delta\Theta 0$, the solenoid valve 14 is brought into its closed condition (i.e., unrestricted flow position), thereby increasing the pressure to be applied to the upper side of the spool 1A. Thus, the spool 1A is moved in the downward direction against the biasing force of the spring 13, resulting in the rapid drain of the fluid pressure from the second brake B1.

In the foregoing description, though the underlap control upon 2-3 power-off up-shifting is discussed, other modes of power-off up-shifting can be applied with the basic concept of the present invention.

Obviously, many modifications and variations of the present invention are possible in light of the above teachings. It is, therefore, to be understood that within the scope of the appended claims, the invention may be practiced otherwise than as specifically described.

What is claimed is:

1. A fluid pressure control device which is used in an automatic transmission and which includes a timing valve having a spool that is axially movable according to a signal indicating an engine output upon a power-off up-shifting in order to rapidly drain fluid pressure to the timing valve from a frictional engaging portion, comprising:

a first pressure source from which a pressure indicating the engine output is to be applied to one end portion of the spool;

a second pressure source from which a pressure is to be applied to an end portion of the spool opposite said one end portion so as to be balanced with the pressure from the first pressure source other than during power-off up-shifting; and means for increasing the pressure applied to the one end portion of the spool from the first pressure source when the ratio of the change in accelerator opening with respect to time exceeds one predetermined vale and when the change in quantity of the accelerator opening exceeds another predetermined value.

2. A fluid pressure control device according to claim 1, wherein the means for increasing the pressure applied to the one end portion of the spool includes a solenoid valve disposed between the first pressure source and the one end portion of the spool, and an electric control unit which moves the solenoid to an unrestricted flow condition when said ratio exceeds said one predetermined value and when the change in quantity of the accelerator opening exceeds said another predetermined value.

3. A fluid pressure control device according to claim 3, wherein the electric control device is a micro-processor.

4. A fluid pressure control device according to claim 1, wherein the first pressure source is an oil pump.

5. A fluid pressure control device according to claim 1, wherein the second pressure source is a spring.

* * * * *